United States Patent [19]

Freedman

[11] Patent Number: 4,839,829
[45] Date of Patent: Jun. 13, 1989

[54] AUTOMATED PRINTING CONTROL SYSTEM

[76] Inventor: Henry B. Freedman, P.O. Box 324, Split Rock Rd., Lake Harmony, Pa. 18624

[21] Appl. No.: 927,886

[22] Filed: Nov. 5, 1986

[51] Int. Cl.[4] ............................................. G06F 15/46
[52] U.S. Cl. .................................. 364/519; 101/248; 364/518
[58] Field of Search .............................. 364/518–521, 364/469, 470, 471; 101/248

[56] References Cited

U.S. PATENT DOCUMENTS

| T918,004 | 1/1974 | Chappell et al | 364/300 |
|---|---|---|---|
| 3,581,072 | 5/1971 | Nymeyer | 364/300 |
| 3,703,006 | 11/1972 | Sharma | 364/300 |
| 3,905,045 | 9/1975 | Nickel | 364/300 |
| 3,930,251 | 12/1975 | Salava et al. | 364/523 |
| 3,988,570 | 10/1976 | Murphy et al. | 235/382 |
| 4,007,362 | 2/1977 | Sindermann | 364/518 |
| 4,017,831 | 4/1977 | Tieden et al. | 348/825.72 |
| 4,231,096 | 10/1980 | Hansen et al. | 364/523 |
| 4,400,783 | 8/1983 | Locke, Jr. et al. | 364/483 |
| 4,433,426 | 2/1984 | Forster et al. | 377/2 |
| 4,449,186 | 5/1984 | Kelly et al. | 364/407 |
| 4,468,750 | 8/1984 | Chamoff et al. | 364/900 |
| 4,475,156 | 10/1984 | Federico et al. | 364/300 |
| 4,484,522 | 11/1984 | Simeth | 101/248 |
| 4,495,582 | 1/1985 | Dessert et al. | 364/469 |
| 4,578,768 | 3/1986 | Racine | 364/560 |
| 4,584,648 | 4/1986 | Dlugos | 364/464 |
| 4,601,003 | 7/1986 | Yoneyama et al. | 364/518 |

Primary Examiner—Gary V. Harkcom
Assistant Examiner—H. R. Herndon

[57] ABSTRACT

A system for automated control of the printing of a work comprises a first terminal adapted for use by a printing requester for receiving from the requester a informaton concerning parameters for the printing of the work. A second terminal is adapted for use by a printing facility for receiving from the printing facility pricing and administrative information concerning the printing of a work. A programmed computer having a memory and input/output means is provided in communication with the first and second terminals. The computer interacts with the printing requester through the first terminal for receiving and storing the printing parameter information. The computer interacts with the printing facility for receiving and storing pricing and administrative information concerning the printing of the work. The pricing and administrative information is transmitted to the first terminal for use by the printing requester.

64 Claims, 6 Drawing Sheets

Microfiche Appendix Included
(1 Microfiche, 17 Pages)

AUTOMATED PRINTING CONTROL SYSTEM

BACKGROUND OF THE INVENTION

Reference is made to a Microfiche Appendix comprised of one (1) microfiche and seventeen (17) frames. The Microfiche Appendix contains a computer generated program listing of a preferred embodiment of the invention.

The present invention relates generally to a network or automated control system for the printing of a work using a variety of conventional and emerging graphic arts processes and techniques. The system employs a computer network which is programmed so that a printing requester or user can interface, through the computer network, with the printing facility for the printing or publishing of a work or job. More specifically, the system interacts with the user for collecting and storing information or parameters regarding the user's needs (i.e., cost requirements, photos, pictures, graphics, deadlines, number of documents to be printed, colors used, kinds of paper, typeface to be used, etc). The system then compares the information from the user with stored information relating to the printed work design and capabilities of various printing facilities (i.e., types of printing equipment available, for example, offset presses, paper cutters and/or binding equipment, operating costs, time, process requirements, etc.). The system also evaluates which printing facility and/or particular type of printing equipment is most compatible with the user's specific printing needs. The evaluation is presented typically over a conventional telephone network or through a direct local network to the user to permit the user to select and execute a particular course of action based on the various available options. In addition, the system is designed to handle all of the administrative details (orders, billing, etc.) involved with such a printing job. Furthermore, the system's interactive nature is well suited for monitoring and modifying a previously selected printing job order while the printing job is in progress.

In recent years, there has been a tremendous growth in the printing industry. This, in part, has been supported by both the general increase in global communications and the development of new technology. Unfortunately, the complementary development of the support technology for efficiently and effectively utilizing these new printing technologies has not kept pace with the recent advances. Thus, the overall printing process is only as efficient as its weakest link—client/printing company interfacing regarding the printing requirements, costs, scheduling, etc. The present invention efficiently and cost effectively eliminates many of the intrinsic impediments incurred in the routine business practices of the printing industry.

Prior to the present invention, enormous amounts of information had to be exchanged between a prospective customer and a printing facility before an order could be initiated and successfully completed. This often resulted in numerous time-consuming personal contacts between prospective customers and company personnel; inaccurate transmission of information regarding costs, job requirements, etc.; chaotic work scheduling practices; and numerous difficulties in modifying or redirecting previously arranged work job orders. In addition, it was difficult for a customer to know if the price for the printing job was fair since each printing facility had its own distinct pricing structure, making comparison between printing facilities difficult. The present invention provides a systematic approach to alleviate and/or eliminate these difficulties to permit a customer to quickly relate specific printing needs to a printing facility by a computer interface.

In routine business practices within the printing industry, considerable time is also spent securing, initiating, and completing a job order. For example, a sales person may travel to a prospective customer's place of business and spend twenty-five to forty minutes assessing the requirements for a job order (e.g., type of work, specific needs, volume of work, and deadline). This information is then forwarded to an in-house printing estimator for cost analysis regarding the number and types of supplies to be used in the printing job, procedures to be employed in the printing process, labor costs involved in the job order, etc. A cost estimate of the printing job is then prepared, typically taking from five to ten days to complete, depending on the work flow within the printing facility. The customer, after receiving the printing company's initial estimate, may opt for other printing alternatives and thus the process may begin anew.

Concurrent with the price estimate, an assessment is generally conducted to determine the compatibility between the requirements of the job order and the capacity of the printing facility. This usually involves input from numerous individuals and is a very time-consuming process. The variables which are taken into account in this type of assessment include the number of pages to be printed, the types of presses to be used in the printing process, the types of color processes to be employed, the types and number of cameras to be used, the number of photo shots to be taken, the types and amount of ink required, the amount of waste paper resulting from the printing process, and the time and labor costs for completing the printing job.

The present invention quickly assesses the customer's specific printing requirements with regard to the capacity or capabilities of numerous printing facilities. This is accomplished by utilizing an interactive program mode which employs various request/response sequences. The information gathered from the customer by this technique is correlated with a data base of stored information from a specific or various printing facilities. In this manner, the user is instantaneously provided with accurate information regarding costs, print facility capacity, scheduling, etc. and with information relating to relevant alternatives which can expedite the ordering process.

Furthermore, the invention incorporates advanced capabilities to define the waste per process and on a per machine basis so as to accurately arrive at the optimum economic selection for manufacturing the printed job. This is accomplished by an exhaustive assessment of all manufacturing options automatically and in parallel within seconds by lay persons, whereas, as presently practiced this would take days. The prior art requires skilled trade and craft persons to make human selection for what is perceived as the ideal production method and then to calculate the cost and production requirements from this one selected option, ignoring the other options and frequently losing the least cost method of manufacturing the printed work. With the automated printing network of the present invention, if the printing company does not want the customer to have this capability, the customer can issue a request on the network and the design parameters of the requester's particular work is then automatically loaded into the receiving printing locations portion of the network system, thereby allowing the printing facility to automatically select the optimum method for production, to privately view and modify, if desired, the results, and then automatically respond to the customer via the network, thus maintaining the right of review prior to the requester receiving a response. Thus, the customer can quickly, efficiently, and systematically decide which printing facility most specifically fits present printing needs. The printing facilities also benefit in that a job order is completed in an accurate and systematic manner, and the company's work schedules can be appropriately and smoothly adjusted to accommodate the anticipated work flow. Therefore, the present invention is mutually beneficial to both the printing user and the printing facilities in their daily business activities.

Another common problem encountered in the daily practices of the printing industry occurs when a client opts to modify a standing printing order. This often involves a customer directly contacting the printing facility to locate the responsible sales representative. Should the sales representative be unavailable, the inquiry generally will be directed to the production manager of the printing facility. The production manager has to interrupt his work schedule to physically locate the particular job order in the printing facility and assess its present status. Upon gathering this information the production manager will, at a subsequent time, contact the customer with the current status of the job. The customer will then require time to assess the status information and determine a course of action. Should the customer's job still require modification, the printing facility will have to redirect the job, possibly to alternative presses, and adjust the cost and production schedules accordingly, etc. This process is generally very time consuming and may require the customer to interact with numerous printing facility people to insure that the proper changes or modifications are instituted in the printing job. The present invention provides a direct, on-line capability for a print facility to conveniently modify job orders, assess the present status of a printing job, and calculate the adjusted costs involved in such modifications.

SUMMARY OF THE INVENTION

Briefly stated, the present invention comprises a system for automated control of the printing of a work. The system comprises a first terminal adapted for use by a printing requester for receiving from the requester a work to be printed and information concerning parameters for the printing of the work. A second terminal is adapted for use by a printing facility for receiving from the printing facility pricing and administration information concerning the printing of a work. A programmed computer having a memory and input/output means is also provided in communication with the first and second terminals. The computer interacts with the printing requester through the first terminal for receiving and storing the printing parameter information. The computer transmits printing parameter information to the second terminal for use by the printing facility. The computer also interacts with the printing facility through the second terminal for receiving and storing pricing and administrative information concerning the printing of the work. The computer transmits the pricing and administrative information to the first terminal for use by the printing requester.

BRIEF DESCRIPTION OF THE DRAWINGS

The foregoing summary, as well as the following detailed description, will be better understood when read in conjunction with the appended drawings. For the purpose of illustrating the invention, there is shown in the drawings an embodiment which is presently preferred, it being understood, however, that the invention is not limited to the precise arrangement and instrumentality shown. In the drawings.

DESCRIPTION OF A PREFERRED EMBODIMENT

Figure 1A:
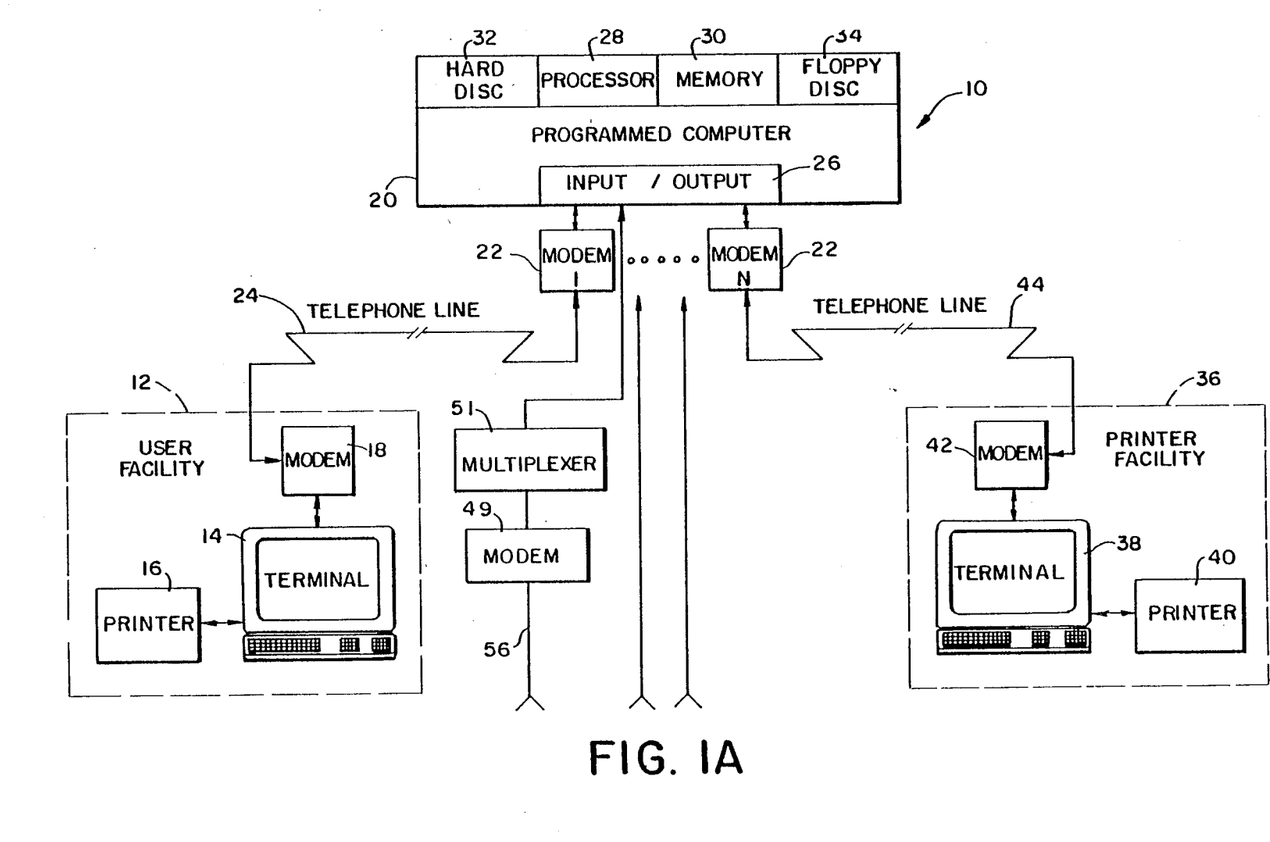
FIGS. 1A and B are a schematic block diagram of a system for automated control of the printing of a work in accordance with the present invention.
Figure 1B:
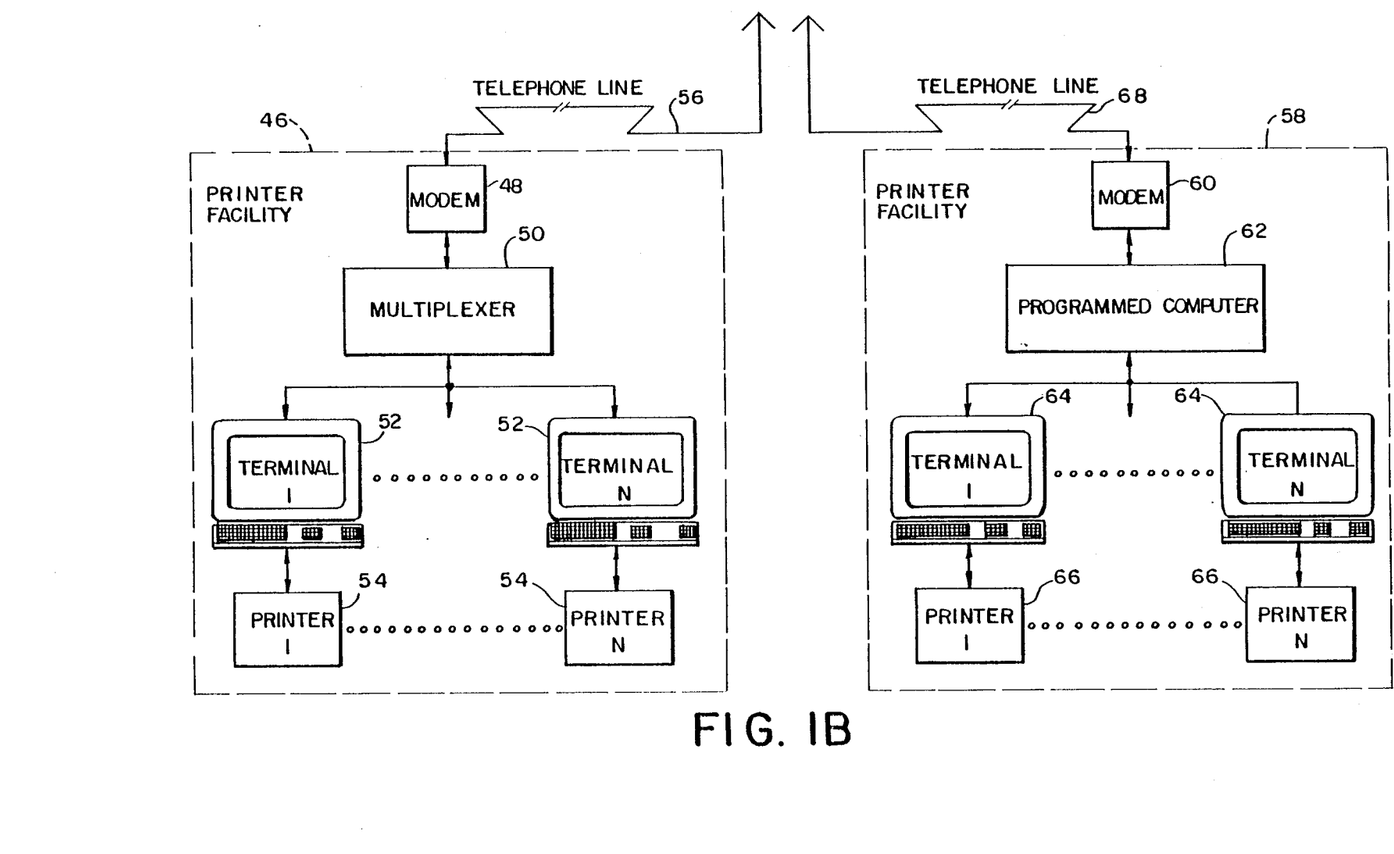

Referring to FIG. 1, there is shown a schematic block diagram of a system 10 for automated control of the printing of a work. In connection with the present embodiment, the term "printing" is intended to encompass any and all processes and/or the use of any type of machine or device which can be employed or utilized for preparing and producing imaging on a substrate which can be machine or humanly read, including, but without limitation: letter press, intaglio, gravure, lithographic, electrophotographic, flexographic, ink jet, thermographic and offset lithographic.

In addition, as used in the present application, the term "work" is also intended to encompass its broadest possible meaning to include, but without limitation: newsletters, magazines, books, pamphlets, posters, reports, flyers, direct mail items, directories, business cards and virtually all other types of printed matter.

The presently preferred embodiment of the invention comprises at least one first terminal 12 which is adapted for use by a printing requester or user. As shown in FIG. 1, the first terminal 12 is comprised of a standard alphanumeric terminal and display unit 14, a hard copy printer 16, and a communications modem 18, which are suitably interconnected in the manner shown by suitable interconnection cables of types well known in the art. The alphanumeric terminal and display unit 14 could be of any known type which is commercially available, such as a CIT 224 work station from ITOH, of Japan. The terminal can be a stand-alone terminal adapted merely for receipt of input and display of output. Alternatively, the terminal can be a computer having additional data storage and/or data processing capabilities, such as a microprocessor-driven personal computer. Similarly, the printer 16 could be of any type well known in the art, such as a model 4510 dot matrix printer from Facit, of Sweden. Preferably, the modem 18 is also of a type well known in the art and is capable of transmitting and receiving data and instruction at rates between 300 and 1200 baud. A suitable modem is a UDSC 212A/D modem available from Universal Data Systems, Inc.

The system 10 further comprises at least one programmed computer or computer network 20, preferably a digital computer, which may be co-located with the first terminal 12, but which usually is physically located at a facility which is remote from the first terminal 12. The programmed computer 20 includes at least one, and preferably a plurality, of modems 22, and preferably of the same type as modem 18 employed in connection with the first terminal 12. Communications between the first or user terminal 12 and the programmed computer 20 is provided by one or more lines, preferably telephone lines 24. The telephone lines 24 may be individual dedicated lines which are specifically adapted for the transmission of high speed data. Alternatively, the telephone lines 24 may be of the standard type normally employed for the transmission of voice or audio communications. Preferably, the telephone lines 24 comprise business data phone lines available from AT&T. The embodiment of FIGS. 1A and 1B employs circuit switch technology for the transport of computer information. It will be recognized by those skilled in the art that other technologies could be employed for the transport and switching of the computer information, for example, a packet switch network with interface message processors such as employed by GTE in its "Telenet" System.

As previously indicated, the first or user terminal 12 may be physically positioned proximate the computer 20. For example, the user terminal 12 and the computer 20 may be located in the same building or building complex as the printing facility, such as in conjunction with an "in-house" printing system. Alternatively, the user terminal 12 may be, and preferably is, remotely located from the computer 20. For example user terminals 12 may be provided at various locations around a building complex, town or city with all of the user terminals 12 being connected by telephone lines 24 to a centrally located computer 12. Alternatively, several branches or divisions of a particular company or agency may have its own user terminal 12. Another possibility is that one or more individual authors may have his or her own user terminal 12 located at his or her home, office, etc. Alternatively, a printing broker could have such a terminal and could operate the terminal as a brokerage exchange to offer printing jobs to various printers. Thus, it will be appreciated by those skilled in the art that the purpose of the first or user terminal 12 is to enable communication between a printing requester or user and the computer 20, regardless of the physical location of the user and regardless of whether the user is an employee of a particular company or agency, an individual with his or her personal user terminal, or any other such situation.

The programmed computer 20 is preferably of a type well known in the art which includes input/output means 26, a central processing unit or processor 28, random access or main memory 30, one or more hard disks 32, and one or more floppy disk drives 34. The computer 20 may be from any of a variety of different manufacturers who produce commercially available products of a type suitable for use with the present system. The computer 20 presently preferred is an AT personal computer available from International Business Machines, Inc. The AT personal computer includes a 6/32 bit 80286 processor 28, 512 kilobyte RAM main memory 30, a 20 megabyte hard disk 32, and 1.2 megabyte and 362 kilobyte floppy disk drives 34. Additional system hardware upgrades may also be utilized, if desired. For example, an IBM 80287 math coprocessor (not shown) may be utilized to enhance floating point computational speeds. Similarly, execution speed of the computer may be increased, for example, by the use of a 286* turbo switch available from Megahertz Corporation which, in effect, speeds up the system clock of the IBM machine from six megahertz to eight megahertz. In addition, the main memory 30 may be expanded utilizing known equipment and techniques.

The input/output means 26 includes a printer, for example, an IBM dot matrix pro printer (not shown) for receiving and printing hard copy of information from the computer 20. Suitable additional communications hardware may also be employed to provide means for permitting simultaneous access by multiple users. For example, an eight port hostess board (not shown) available from Control Systems, Inc. may be employed to permit as many as ten simultaneous users or requesters to access the computer 20, communicating at speeds ranging from 300 baud to 9600 baud by way of multiple modems 22.

It will be appreciated by those skilled in the art that the present invention is not limited to any particular type of hardware, such as the above-described computer 20. The type of hardware employed with the present invention may vary, depending upon the number of requesters or users accessing the system, the number of printing facilities having access to the system, the demand upon the system, and other factors which will be apparent to those skilled in the art. Thus, it should be clearly understood that the above-described computer system hardware is set forth merely for the purpose of completeness in illustrating an embodiment which is presently preferred, primarily because it is the hardware which is presently being employed by the applicant. Certainly, it will be recognized by those skilled in the art that the present invention is not limited to the above-described or any other specific type of computer hardware structure.

The system 10 further includes at least one second terminal 36 adapted for use by a graphic arts printing or printer facility. As shown in FIG. 1, the second terminal 36 is comprised of a standard alpha-numeric terminal and display unit 38, a hard copy printer 40, and a communications modem 42. Similarly, the second terminal can also be comprised of a computer as discussed above in connection with the first terminal. The modem 42 and printer 40 are suitably connected to the alphanumeric terminal and display unit 38 by suitable interconnection cables. The alphanumeric terminal and display unit 38, printer 40 and modem 42 are all commercially available components and could be the same components as those described above in connection with the first or user terminal 12. The second or printer facility terminal 36 is in communication with the programmed computer 20 by one or more telephone lines 44 which may also be of the type previously described.

The second or printer facility terminal 36 is of a type which typically may be used by a small printing company having only a single location which is not too great in size. Alternatively, a plurality of such terminals could be employed by a larger printing company having multiple printing facilities at different locations or from a large printing company having a single large facility but wishing to have multiple terminals at differing locations throughout that facility.

It will be appreciated by those skilled in the art that other, more sophisticated printer facility terminals may alternatively be employed. For example, FIG. 1B shows an alternate form of a second or printer facility terminal 46 Which includes a single modem 48 which is connected through a multiplexer 50 through a plurality of individual alphanumeric terminal and display units 52 (shown as 1 through N). Each alphanumeric terminal and display unit 52 includes its own hard copy printer 54 (also shown as 1 through N) connected by suitable interconnection cables of a type well known in the art. Communication between the modem 48 and the programmed computer 20 is provided by one or more telephone lines 56 which also may be of the type previously described. The multiplexer 50 may be a time division multiplexer of any other type well known in the art and commercially available. A similar modem 49 and multiplexer 51 are provided proximate the computer 20. The multiplexers 50 and 51 and the modems 48 and 49 permit a printing facility to communicate with the programmed computer 20 from different locations throughout the facility, utilizing only a single communication connection or set of telephone lines 56. In addition, the use of such multiplexers permits the transfer of information at a rate of 9600 baud or greater.

FIG. 1 shows another alternate form of a second or printer facility terminal 58. Terminal 58 includes a single modem 60 which is connected through a programmed computer 62 to a plurality of individual alphanumeric terminal and display units 64 (shown as 1 through N). Each alphanumeric terminal and display unit 64 includes its own printer 66 (also shown as 1 through N) connected by suitable interconnecting cables (not shown in detail). Communication between the printer facility terminal 58 and the programmed computer 20 is provided by telephone lines 68 also of the type previously described. The programmed computer 62 which is located at the printer facility, permits the printer facility to control and allocate communication between the individual alphanumeric terminal and display units 64 and the programmed computer 20.

As previously stated, the present invention provides automated control of the printing of a work. Control of the printing is obtained by the programmed computer 20 interfacing or interacting with an individual printing requester or user through the first or user terminal. Essentially, the programmed computer 20 obtains from the printing requester and stores information concerning the work to be printed. The information is obtained by the programmed computer 20 requesting specific answers to a series of detailed questions with possible additional questions being asked, depending upon the responses obtained through the initial questions. The answers to the questions are entered by the user through the first terminal 12 and are initially stored in the memory 30 of the programmed computer 20. When all or substantially all of the questions have been answered by the printing requester or user, the memory 30 of the programmed computer 20 contains printing parameter information comprising substantially all of the information necessary for printing of the work in the manner specifically required or requested by the printing requester. As will hereinafter be described, the stored information is essentially transmitted to a printing facility through a second or printing facility terminal 36, 46 or 58 for printing of the work.

Figure 2A:
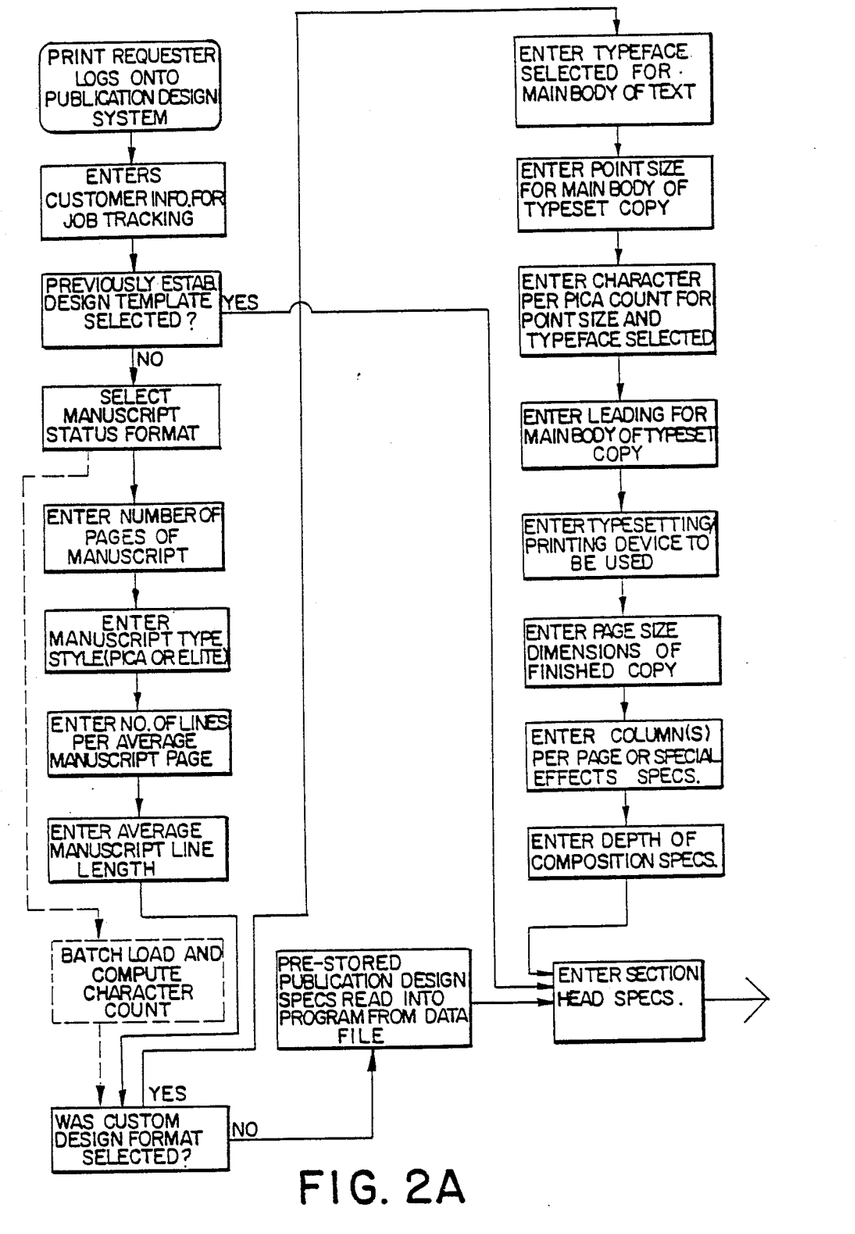
FIGS. 2A and B are a flow diagram of a portion of the computer program utilized for interaction between the computer and the printing requester.
Figure 2B:
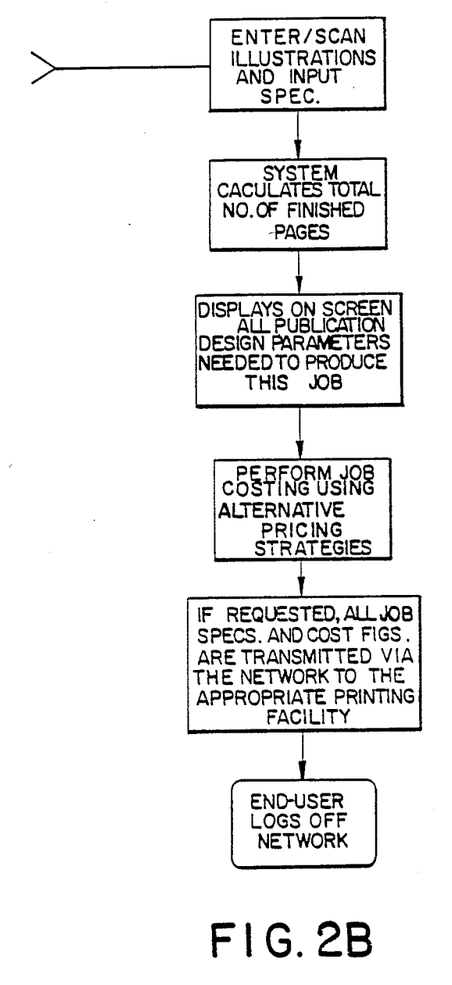

FIGS. 2A and 2B are a flow chart or a flow diagram of a portion of the computer program utilized for interaction between the programmed computer 20 and the printing requester. A printing requester or user initially enters or logs onto the system at a user terminal 12 by providing a password, keyword or the like which is used in connection with an access control system (not shown). After verifying that the user is authorized to access the system, the programmed computer 20 requests the user to enter customer identification information such as the name and address of the customer, billing address, billing code, or the like. In addition, the user is requested to enter a particular job identification number or code in order to facilitate tracking of the printing job as it is processed through the various stages involved in producing the final printed product. In this manner, the requester and/or a printing facility employee could check on the status of the printing job at any time during the printing cycle. This also permits management and adjustment in scheduling ancillary processes such as packing, mailing, advertising, etc.

The network includes a messenger system which permits communication between a printing requester and all other parties on the system in a manner similar to that of an electronic store and forward system. In addition, graphics could be scanned and transmitted along the network.

The computer 20 then asks the requester to select a printing parameter design template which may have been previously established for a particular type of printing job. Alternatively, as described below, the customer may elect to enter printing parameters to establish a new custom design template. All responses are in English language dialog; however, a user is not prevented from using other languages. For the convenience of the requester, the computer makes available to the requester a variety of design templates, any one of which can be conveniently selected. The design templates made available by the computer for selection are typical of those in general use in the printing industry or may be specialized templates particularly suited to a certain customer or type of printing job.

If a new template is to be established, the requester is asked to select a particular manuscript status format. For example, the requester may be asked to select whether the manuscript will be a book, newsletter, etc. The computer provides the requester with a number of possible formats which could be selected. The formats made available for selection are typical of those employed in the printing industry or to a particular customer or type of work.

The requester then has two options. The requester can batch load the entire manuscript into the computer in the desired form, thereby skipping over several of the below-discussed steps. Alternatively, the requester is asked to enter the number of pages of provided manuscript, to enter the character type of the provided manuscript, to enter the number of lines residing on the provided average manuscript page and the degree of mark-up of the average manuscript page, and to enter the average manuscript line length. This permits the computer to determine some of the printing parameters.

The computer then gives the user the option of selecting a custom design format or utilizing publication design specifications which have been previously stored in the computer. If a custom design format is selected, the requester is then asked to enter the typeface selected for the main body of the text, the point size for the main body of the text, the character per pica count for the point size and typeface selected, the leading for the main body, the printing or typesetting device to be used, the page size dimensions of the finished copy, the columns per page or special effects specifications, and depth of composition specifications. In short, the requester is asked to enter all of the printing parameters necessary for setting up and printing the work in the custom format.

The network has built-in conversion algorithms so that any format may be used for entering the point size, leading column width, etc. For example, point size may be entered in points, inches, millimeters, etc. and is converted to the appropriate equivalent units for the printing job. In addition, the network has stored tables of various typographic variables on a per machine basis and the corresponding characters per pica count and other information to assisting in the entry of such parameters.

Whether a standard, prestored format is selected, or the requester enters a custom format, the requester is then asked to enter section head specifications and to enter or scan illustrations and input specifications for the illustrations.

The network incorporates expert systems software that reviews the inputs of the requester, compares the inputs to stored rules of the printing trade and prohibits violations of the rules from occurring. The stored rules may be from the U. S. Government Printing Office Style Manual, the Chicago Style Manual, a corporate Style Manual or the like, or may be individually tailored rules. Such a process is particularly important in order to avoid unnecessary duplication of effort and waste of materials and time and to avoid delays in the printing of the work. It also is valuable in educating and training a requester or printing employee with respect to proper printing techniques. For example, if a requester attempts to insert a graphic, such as a photograph into a design template where the graphic has been improperly scaled with respect to the size of the printed page, the network applies the stored rules relating to the scaling of graphics to prohibit such an insertion. In addition, the network provides the terminal operator with an explanation as to why the insertion cannot be made and recommends alternative solutions. In this manner, for example, by preventing the insertion of an improperly scaled graphic, the network avoids the need for several camera exposure or scans, saving both film and operator and equipment time, and avoids interruption in the normal work flow which could occur if the error is not detected until a later stage in the printing process.

The network also applies the stored rules to provide parameters to the graphic producer to assist in preparation of the graphic. For example, once a graphic has been properly scaled, the network provides parameters for the correct camera copy and lens board or scanner enlargement or reduction settings, as well as the amount of film or other materials needed. The network may also be employed for direct numerical control of the graphic production equipment.

The network also applies stored rules to insure compliance with industry, legal or other standards or requirements. For example, Truth-in-Lending and other regulations require that contractual documents have a minimum typeface point size requirement. If the typeface point size selected for a job falling into this category is less than the minimum, the network rejects the requested typeface point size giving the reason and recommends an appropriate point size in compliance with the applicable regulations.

Once the computer is provided with all of the previously described information for the printing job, the computer calculates the total number of finished pages for the job and displays to the requester all publication design parameters needed to produce the job in the manner selected. The parameters displayed include, for example, the compaction/expansion ratio for the manuscript as a function of the type and format selected, the unused area remaining on the last page of the printed copy, and a comprehensive summary description of the printing job, etc. The purpose of providing this information is to allow one or more printing parameters to be modified if they are not acceptable. For example, it may be desirable to reduce the typeface point size to decrease the total number of pages of the final document. Alternatively, it may be desirable to insert an additional graphic at some point in the text to fill up the last page or to insert an advertisement, form or coupon on the last or some other page for efficient usage of all pages.

Assuming that the requester makes no further changes, the computer then calculates cost information utilizing alternate pricing strategies based upon usage of different printing or publishing equipment and based upon the parameters of differing printing facilities. The requester is then provided with information regarding the various job costs, timing, etc. and is given the opportunity to select a particular printing facility or a particular machine or mix of machines for production of the job. Alternatively, the requester may permit the system to select a particular printing facility or printing equipment for production of the job. Once the selection is made, the requester authorizes the system to proceed with the printing job and all of the parameters and other information is transmitted by the computer to the appropriate printing facility and informs the requester that acceptance of the work by the printing facility forms a binding contract between the two parties. A printed verification of the parameters, prices, etc. is provided to the requester and the requester then logs off of the system.

The present system can also provide job station information to a requester or another who desires to learn the status of a specific printing job. The first terminal can be adapted for receiving job status inquiries from an inquirer and transmitting the job status inquiries to the programmed computer. In this case, the programmed computer can include a job status file and the programmed computer can be adapted for receiving and responding to the job status inquiries using the job status file. The first terminal can receive and display the response of the programmed computer concerning the job status inquiry. The second terminal can be adapted for receiving job status data to the programmed computer. The programmed computer receives the job status data from the second terminal and stores the job status data in the job status file. At least a portion of the job status data can be received by the second terminal from an operator or from an automated data generation device.

Figure 3A:
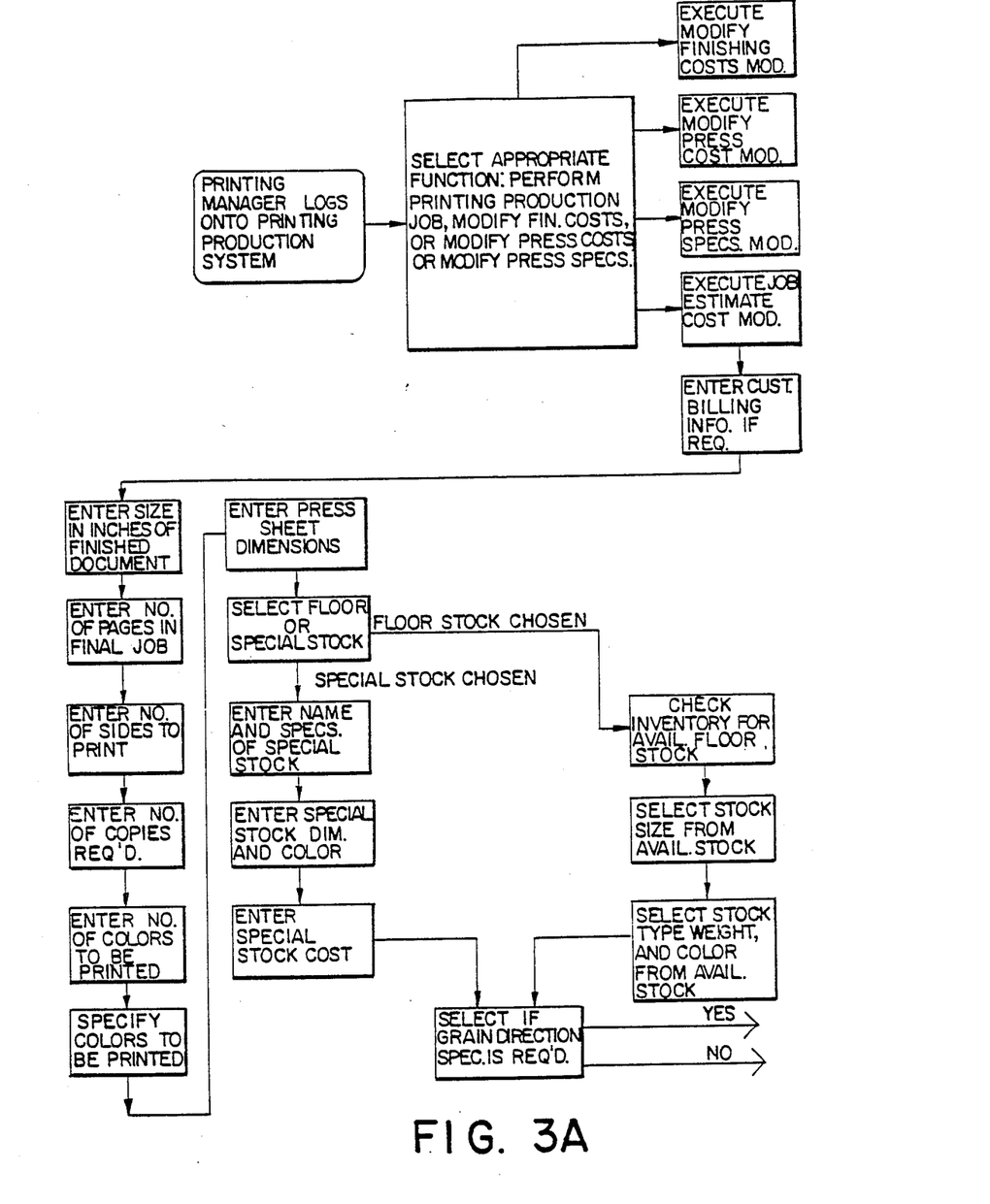
FIGS. 3A and B are a flow diagram of another portion of the program utilized for interaction between the computer and the printing facility.
Figure 3B:
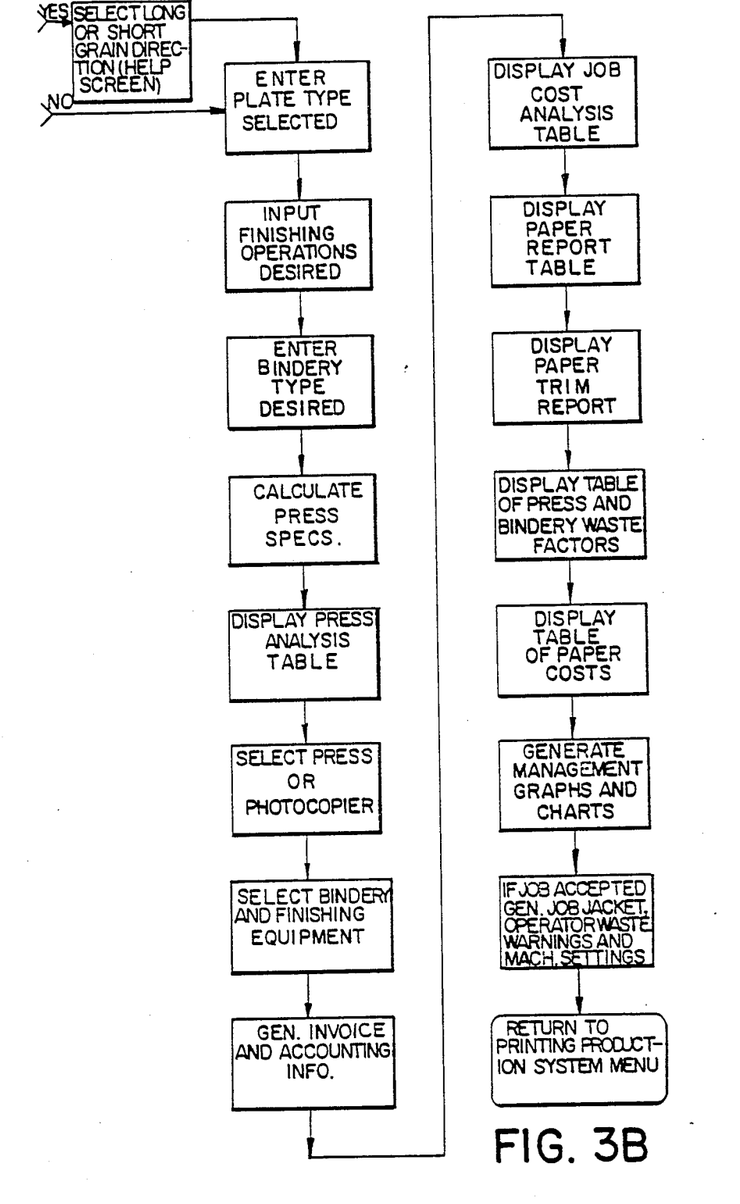

The present invention can also be of great value to a printing facility in its own internal estimation of printing jobs FIGS. 3A and 3B show a flow diagram of the manner in which a printing facility can quickly and accurately provide a cost estimate for a particular job, as well as estimates of required materials, manpower, production scheduling, machine controls, waste management, management reporting and management communication or messaging.

This portion of the network could be utilized by a printing facility in conjunction with the estimation and completion of a printing job without the previously described user portion of the network. For example, if a customer came to the printing facility with camera ready copy, or contacts the printing facility by telephone, etc., the printing facility could use that portion for automated estimation and completion of the job as described below. Alternatively, this portion of the network could be used in conjunction with information and parameters obtained from the printing requester by the portion of the network shown in FIGS. 2A and B as described above. Similarly, the present invention can be used for automated control of the printing of a work by the printing facility without the first terminal.

After logging onto the system, the printing manager or other printing facility employee (hereinafter sometimes referred to collectively as "the printing manager," "manager" or "printing facility manager") selects from a plurality of modules (not shown) the job estimate/cost module. After entering customer billing information, such as the name of the customer, address of the customer, etc., the computer and the printing manager interact to establish the parameters of the printing job. The computer first requests that the printing manager enter the size and number of pages of the finished document, as well as the number of sides to be printed. The printing manager then enters the number of copies required, the number of colors to be printed and the specific colors to be printed.

The printing manager has the option of directing the work to be printed on a particular press or presses at the printing facility or permitting the network to recommend or automatically select the particular press or presses. If the printing manager makes the decision, the system may recommend press sheet dimensions and he may then enter the press sheet dimensions for the selected press or presses. Otherwise, the processing continues as described below.

The printing manager then selects whether a standard or floor stock is to be used, based upon a recommendation made by the network, or whether a special stock is to be used in the job. If the floor stock selected is not the one recommended by the network, the network checks its data base to determine if a sufficient inventory of floor stock is available, selects the stock size from the available supply, and selects the stock weight, type and color from the available supply. If it is determined that the supply of the chosen floor stock is insufficient, the network alerts the manager of the need to obtain additional stock and, at the option of the manager, identifies one or more supplier sources and, if desired, generates a purchase order or other documentation which could be conventionally transmitted to a supplier to provide the required stock. If a special stock is chosen, the printing manager is requested to enter the name and specifications of the special stock, to enter the special stock dimension and color, and to enter the cost of the special stock. At the option of the manager, the network could identify one or more supplier sources for the special stock and could generate and transmit a purchase order or other document for procurement of the special stock.

Once the information concerning the stock has been entered, the manager is requested to select whether a specific grain direction is required. If so, the manager must then select the proper grain direction or the system may recommend an appropriate grain direction.

The manager has the option of selecting a particular plate type or permitting the network to recommend or automatically select a particular plate, depending upon the run length, the press type, the plate cost, etc. If the manager makes the choice, he enters the plate type selected. Otherwise, the processing continues as described below.

The computer provides a listing of possible plate types and finishing operations to assist the manager in making the selection. If the manager selects the finishing operation, he enters the appropriate choice; otherwise the processing continues as described below.

The manager also enters the type of bindery desired from a list of possible binderies provided by the computer, or, as indicated, he has the option of making a specific choice.

The computer then calculates all of the press specifications and displays the press analysis in the form of tables for use by the printing manager. In connection with the press analysis tables, various types of equipment available within the printing facility are displayed, along with all of the data associated with each type of equipment.

The printing manager can then select the particular printing equipment to be utilized to perform the particular job. The selection may be based upon any one of a number of parameters, including the least expensive for the entire job, the press which will utilize the least amount of paper in the event that the particular stock chosen is low, the fastest equipment in the event that the job is a rush job, the equipment which will provide the desired or approximate image quality, the equipment which will permit the most efficient completion in accordance with the available work force or job mix in the printing facility, etc. Similarly, the printing manager selects the bindery and finishing equipment for the job, again based upon any one of a number of parameters, such as timing, cost, quality, etc. Alternatively, the network recommends or automatically selects the particular printing equipment, binding and finishing equipment, as well as the appropriate packaging, shipping or mailing methods, etc. based upon time, cost and the quality needs for the job. Once the printing equipment, bindery and finishing equipment has been selected, the computer generates a preliminary estimated invoice to the customer and provides other accounting information for use by the printing facility accounting system.

The present invention also provides the printing facility manager with additional information to assist in the management of the printing facility. The computer can display a cost job analysis table showing the cost of the job as produced on the various pieces of printing equipment available in the printing facility. This table includes all materials used in the job including toner, ink, glue, staples, paper, etc. The computer can also display a paper report table and a paper trim report showing paper usage and paper wastage for each particular piece of printing equipment prior to the printing of the job. This will enable the manager to know more precisely how much paper is required to permit the paper usage to be minimized, to decrease the machine time required to complete the job and to provide accurate cost and scheduling information. Similarly, the computer can display a table of printing press and bindery waste factors, as well as a table of overall paper costs for printing of the job on each piece of equipment. In addition to displaying the above-described parameters, the computer is able to generate management graphs and charts for use by printing facility management. For example, charts could be compiled showing order frequency for the printing jobs of a particular type or for all jobs, machine usage by time, operator, tasks or materials, customer records by accounts receivable to assist production authorization, sales reporting by customer, seasonal customer requirements, customer submission and alteration characteristics and timing, machine maintenance and repair, machine repair response time by repair services, shipping and receiving schedules, identification of interruptions and reasons for delay in printing.

If the print requester decides to proceed with the printing job, the network generates additional information to facilitate the actual printing of the work. For example, the network generates the "job jacket" which moves along with the printing job through the various stages of the printing process. The network also generates machine settings which may be directly or manually applied to graphic machines, for example, numerical control settings. The network also generates operator waste warnings to make the operators cognizant of anticipated or predicted waste parameters to assist in waste reduction.

Once the module has been completed, the printing manager can return to the printing production system menu to obtain necessary information regarding another printing job or to select one of the other modules (not shown).

From the foregoing description and the appended drawings, it can be seen that the present invention comprises an automated control system or network for the printing of a work. It will be recognized by those skilled in the art that the above-described embodiment is merely illustrative of one form of the invention and that changes or modification could be made to this embodiment without departing from the broad concepts thereof. Therefore, the invention is not limited to the above-described embodiment, but it is intended to extend to the entire scope and spirit of the invention as set forth in the appended claims.

I claim:

1. A telecommunications system for automated control of the printing of a work by a printing facility from a requester at a location remote from the printing facility comprising:
   a first terminal for use by a printing requester for receiving from the requester information concerning printing parameters necessary to forecast at least the cost required to manufacture a printed work;
   a second terminal located at the printing facility for receiving from the printing facility pricing and administrative information concerning the printing of a work; and
   a programmed computer having a memory means for storing at least a set of printing rules, and input/output means, the computer being in communication with the first and second terminals, the computer including means for interacting with the printing requester by a series of queries and responses for receiving and storing in said memory means said printing parameters, for comparing said printing parameters with the stored printing rules and for informing the requester if a rule is violated through the first terminal via the input/output means, the computer including means for transmitting the printing parameter information necessary to forecast the cost required to manufacture the printed work to the second terminal for use by the printing facility, the computer further including means responsive to said remotely input printing parameters and interacting with the printing facility by a series of queries and responses through the second terminal via the input/output means for receiving and storing in the memory means pricing and administrative information concerning the printing of the work, and means for transmitting selected pricing and administrative information to the first terminal for use by the printing requester, the first terminal including means for displaying the selected pricing and administrative information to the printing requester and means for permitting the requester at the remote location to select whether to proceed with the printing of the work by the printing facility based upon the pricing and administrative information.

2. A system according to claim 1 wherein the programmed computer includes means for processing a portion of the information concerning the printing parameters and the pricing and administrative information to obtain at least one dependent parameter value.

3. A system according to claim 1 wherein the programmed computer includes:
   a reference file containing a set of predetermined values for at least one parameter;
   means for interactively querying the requester to obtain a parameter value from the requester; and
   means for comparing the parameter value of the requester with the predetermined values for the plurality of parameters to obtain a comparison result.

4. A system according to claim 3 wherein the means for interactively querying the requester generates a plurality of queries and the identity of at least one of the plurality of queries depends on at least one comparison result generated from a preceding query.

5. A system according to claim 4 wherein the parameter values obtained from the requester include printing parameter values.

6. A system according to claim 5 wherein the printing parameter values obtained from the requester comprise all the information necessary for printing the work.

7. A system according to claim 4 wherein the additional parameter values include values relating to scanner enlargement or reduction settings.

8. A system according to claim 3 wherein the parameter values obtained from the requester include a customer identification.

9. A system according to claim 8 wherein the customer identification include a job identification code.

10. A system according to claim 3 including a reference file containing at least one predetermined printing parameter design template, and the computer further includes means for querying the requester whether the predetermined template is to be used.

11. A system according to claim 10 wherein the computer includes means for querying the requester whether one of the plurality of alternative predetermined templates is to be used.

12. A system according to claim 3 wherein the parameter value obtained from the requester includes parameter values relating to scaling of a graphic, and the computer includes means for computing additional parameter values relating to the graphic, the additional parameter values being transmitted via the input/output means to the first terminal for display to the requester.

13. A system according to claim 12 wherein the additional values include values relating to camera copy lens board for reproduction of a graphic.

14. A system according to claim 1 wherein the computer includes input/output means for communicating with at least one of the first and second terminals through dedicated telephone lines for the transmission of high speed data.

15. A system according to claim 1 wherein the first terminal includes means for inputting graphic subject matter.

16. A system according to claim 15 wherein the means for inputting graphic subject matter includes optical scanner means.

17. A system according to claim 1 wherein the second terminal includes means for inputting graphic subject matter.

18. A system according to claim 17 wherein the means for inputting graphic subject matter includes optical scanner means.

19. A system according to claim 1 comprising a plurality of first terminals at different locations remote from the printing facility for use by printing requesters.

20. A system according to claim 1 comprising a plurality of second terminals for use by the printing facility.

21. A system according to claim 20 wherein the plurality of second terminals are distributed among a plurality of printing facilities.

22. A system according to claim 1 wherein the information concerning parameters for printing of the work includes the number of pages of the work.

23. A system according to claim 1 wherein the information concerning parameters for printing of the work includes the average number of lines of text per page of the work.

24. A system according to claim 1 wherein the information concerning parameters for printing of the work includes the average length of a line of text of the work.

25. A system according to claim 1 wherein the information concerning parameters for printing the work includes the type face selected for the text of the work.

26. A system according to claim 1 wherein the information concerning parameters for printing the work includes the point size for the typeset copy of the work.

27. A system according to claim 1 wherein the information concerning parameters for printing the work includes the pica count per point size and type face.

28. A system according to claim 1 wherein the information concerning parameters for printing the work includes the lead in for the main body of the typeset copy of the work.

29. A system according to claim 1 wherein the information concerning parameters for printing the work includes identification of the typesetting or printing equipment to be used in printing the work.

30. A system according to claim 1 wherein the information concerning parameters for printing the work includes page size dimensions for the finished copy of the work.

31. A system according to claim 1 wherein the information concerning parameters for printing the work includes the number of columns per page of the finished copy of the work.

32. A system according to claim 1 wherein the information concerning parameters for printing the work includes identification of special effects desired by the requester.

33. A system according to claim 1 wherein the information concerning parameters for printing the work includes the depth of composition of the finished copy of the work.

34. A system according to claim 1 wherein the information concerning parameters for printing the work includes section heading specifications.

35. A system according to claim 1 wherein the information concerning parameters for printing the work includes illustration specifications.

36. A system according to claim 1 wherein the programmed computer additionally comprises means for converting information concerning printing parameters received from a requester from a first format to a second format.

37. A system according to claim 1 wherein the programmed computer includes means for computing parameter values from the information concerning printing parameters supplied by the requester and for transmitting the computed parameter values to the requester via the input/output means and the first terminal.

38. A system according to claim 37, the computer additionally comprising means for receiving from the requester via the first terminal and the input/output means alterations in the information concerning the printing parameters previously received the requester; means for computing revised printing parameters from the altered printing parameter information, and means for transmitting the revised printing parameter values to the first terminal via the input output means for review by the requester.

39. A system according to claim 1 comprising a plurality of terminals and means for transmitting information from at least one of the terminals to at least one other of the terminals.

40. A system according to claim 39 wherein the information includes textural and graphics information.

41. A system according to claim 39 wherein the programmed computer includes means for receiving information from at least one of the terminals; means for storing the information; and means for subsequently transmitting the information to at least one other of the terminals.

42. A system according to claim 41 wherein the programmed computer includes means for transmitting the stored information on receipt of a transmission request from the terminal to which the stored information is to be sent.

43. A system according to claim 1 wherein the first terminal receives job status inquiries from an inquirer and transmits the job status inquiries via the input/output means to the programmed computer, the programmed computer including a job status file, the programmed computer further including means for receiving and responding to the job status inquiries using the job status file, the first terminal receiving and displaying the response of the programmed computer concerning the job status inquiry.

44. A system according to claim 44 wherein the second terminal receives job status data and transmits the job status data to the programmed computer via the input/output means, the programmed computer further including means for receiving the job status data from the second terminal and storing the job status data in the job status file.

45. A system according to claim 44 wherein a portion of the job status data is received by the second terminal from an operator.

46. A system according to claim 44 wherein a portion of the job status data is received by the second terminal from an automated data generation device.

47. A system according to claim 1 wherein the computer includes means for generating information to assist in the management of the printing facility from the information received from the requester and the information received from the printing facility.

48. A system according to claim 1 wherein the computer includes means for generating additional information to facilitate the actual printing of the work from the information received from the requester and the information received from the printing facility, the additional information being transmitted from the computer via the input/output means to the second terminal.

49. A system according to claim 1 wherein the computer includes means for evaluating the printing parameters and the work and for generating administrative information based upon the equipment which may be used for printing the work.

50. A system according to claim 49 wherein the information generated by the computer includes information pertaining to the cost involved in printing the work for each type of equipment upon which the work may be printed.

51. A system according to claim 49 wherein the information generated by the computer includes an analysis of the time required for printing the work on each type of equipment upon which the work may be printed.

52. A system according to claim 49 wherein the information generated by the computer includes an estimation of the paper and other waste which would result by the printing of the work for each type of machine upon which the work may be printed.

53. A system according to claim 49 wherein the information generated by the computer includes information regarding the availability of each type of equipment upon which the work may be printed.

54. A system for automated estimation of the costs of printing a work comprising:
- a terminal having a display for use by an estimate requester for receiving from the requester information concerning printing parameters necessary to forecast at least the cost required to manufacture the printed work and pricing and administrative information concerning the printing of the work; and
- a programmed computer having memory means for storing at least a set of printing rules and input/output means, the computer being in communication with the terminal through the input output means, the computer including means for interacting with the estimate requester by a series of queries and responses through the terminal for receiving and storing in the memory printing parameter, pricing and administrative information, the computer further including means for comparing said printing parameter information with the stored rules and for informing the requester if a rule is violated and for estimating the costs of printing the work in accordance with the printing parameters, and means for transmitting the estimated costs via the input/output means to the terminal for display to the estimate requester.

55. A system according to claim 54 wherein the stored set of printing rules comprises a reference file containing a set of predetermined values for a plurality of parameters at least one of the parameter values of the requester is compared with at least one of the predetermined values for the plurality of parameters.

56. A system according to claim 55 wherein the means for interactively querying the requester includes means for generating a plurality of queries and the identity of at least one of the plurality of queries depends on at least one comparison result generated from a proceeding query.

57. A system according to claim 55 wherein the information concerning parameters for the printing of the work includes information concerning at least one of the size and number of pages of the finished work, the number of sides to be printed, the number of copies required, the number of colors to be printed, and the specific colors to printed.

58. A system according to claim 55 wherein the information concerning parameters for the printing of the work includes information relating to press type and plate type to be used in printing the work.

59. A system according to claim 55 wherein the information concerning parameters for the printing of the work includes information relating to paper stock type and characteristics.

60. A system according to claim 55 wherein the information concerning parameters for the printing of the work includes information relating to binding of the work.

61. A process for automated control of the printing of a work by a printing facility at a location remote from a printing requester comprising:
- receiving from a printing requester by a series of queries and responses information concerning parameters necessary to forecast at least the cost required for the printing of the work;
- storing at least a set of printing rules, and the information concerning the parameters necessary to forecast at least the cost required for the printing of the work in a programmed computer having a memory and input/output means;
- comparing the information concerning the parameters with the printing rules and informing the requester if a rule is violated;
- transmitting the printing parameter information necessary to forecast the cost required to manufacture the printed work from the computer to the printing facility;
- receiving from a printing facility by a series of queries and responses and storing in the computer pricing and administrative information concerning the printing of the work;
- transmitting at least a portion of the pricing an administrative information concerning the printing of the work to the printing requester; and
- selecting whether to proceed with the pricing of the work by the printing facility based upon the received pricing and administrative information.

62. A process according to claim 61 wherein the stored set of printing rules comprises a reference file containing a set of predetermined values for a plurality of parameters, and at least one of the parameter values of the requester is compared with at least one of the predetermined values of the plurality of parameters of the reference file.

63. A process according to claim 61 wherein the computer includes means which generates a plurality of queries and the identity of at least one of the plurality of queries depends on at least one comparison results generated from a preceding query.

64. A telecommunications system for automated control of the printing of a work by a printing facility from a requester at a location remote from the printing facility comprising:
- a first terminal at a location remote from a printing facility for use by a printing requester for receiving from the requester information concerning printing parameters necessary to forecast at least the cost required to manufacture the printed work;
- a plurality of second terminals, one such second terminal located at each of a plurality of printing facilities for receiving from the respective printing facility pricing and administrative information concerning the printing of a work; and
- a programmed computer having memory means for storing at least a set of printing rules and input/output means, the computer being in communication with the first terminal and with each of the second terminals, the computer including means for interacting with the printing requester by a series of queries and responses through the first terminal via the input/output means, for receiving and storing in the memory means for printing parameters, for comparing said printing parameters with the stored printing rules and for informing the requester if a rule is violated, the computer including means for transmitting the printing parameter information necessary to forecast the cost required to manufacture the printed work to each of the second terminals for use by the printing facilities, the computer further including means responsive to the printing parameters and interacting with the printing facilities by a series of queries and responses through the respective second terminals, via the input/output means, for receiving and storing in the memory means pricing and administrative information concerning the printing of the work by each of the printing facilities and means for transmitting at least a portion of the pricing and administrative information for each of the printing facilities to the first terminal for use by the printing requester, the first terminal including means for displaying the received pricing and administrative information for each of the printing facilities and means for permitting the requester, at the remote location, to select whether to proceed with the printing of the work and to select the printing facility which is to print the work.

* * * * *